United States Patent
Seymour et al.

(10) Patent No.: US 7,770,925 B2
(45) Date of Patent: Aug. 10, 2010

(54) AIRBAG PROTECTION FLAP

(75) Inventors: Brian T. Seymour, Oakland Township, MI (US); Michael Lachat, Shelby Township, MI (US); Larry D. Rose, South Weber, UT (US)

(73) Assignee: Autoliv ASP, Inc., Ogden, UT (US)

( * ) Notice: Subject to any disclaimer, the term of this patent is extended or adjusted under 35 U.S.C. 154(b) by 132 days.

(21) Appl. No.: 11/714,349

(22) Filed: Mar. 6, 2007

(65) Prior Publication Data
US 2008/0217887 A1 Sep. 11, 2008

(51) Int. Cl.
*B60R 21/231* (2006.01)
(52) U.S. Cl. .................... 280/743.1; 280/728.2
(58) Field of Classification Search .......... 280/728.2, 280/732, 743.1, 743.2
See application file for complete search history.

(56) References Cited

U.S. PATENT DOCUMENTS

| | | | | |
|---|---|---|---|---|
| 4,842,300 | A * | 6/1989 | Ziomek et al. .......... 280/732 |
| 5,346,248 | A | 9/1994 | Rhein et al. |
| 5,407,227 | A * | 4/1995 | Lauritzen et al. ....... 280/728.1 |
| 5,447,329 | A * | 9/1995 | Hamada .............. 280/728.1 |
| 5,452,913 | A * | 9/1995 | Hansen et al. ......... 280/728.1 |
| 5,492,363 | A | 2/1996 | Hartmeyer et al. |
| 5,588,674 | A | 12/1996 | Yoshimura et al. ....... 280/732 |
| 5,613,698 | A * | 3/1997 | Patercsak et al. ....... 280/728.1 |
| 5,630,614 | A * | 5/1997 | Conlee et al. ......... 280/730.1 |
| 5,755,459 | A * | 5/1998 | LaLonde ............. 280/728.3 |
| 5,765,867 | A * | 6/1998 | French .............. 280/743.2 |
| 5,772,239 | A * | 6/1998 | Seymour ............. 280/728.3 |
| 5,823,566 | A * | 10/1998 | Manire .............. 280/728.3 |
| 6,056,318 | A | 5/2000 | Braunschadel |
| 6,131,944 | A | 10/2000 | Henkel et al. |
| 6,371,510 | B1 | 4/2002 | Marriott et al. |
| 6,474,686 | B1 | 11/2002 | Higuchi et al. ......... 280/743.1 |
| 6,669,229 | B2 | 12/2003 | Thomas .............. 280/732 |
| 6,682,093 | B2 * | 1/2004 | Tajima et al. .......... 280/732 |
| 6,874,810 | B2 | 4/2005 | Soderquist ........... 280/728.3 |
| 6,877,772 | B2 | 4/2005 | Fischer et al. ......... 280/743.1 |
| 6,883,831 | B2 * | 4/2005 | Hawthorn et al. ....... 280/739 |
| 6,942,242 | B2 * | 9/2005 | Hawthorn et al. ....... 280/728.2 |
| 6,955,377 | B2 * | 10/2005 | Cooper et al. ......... 280/743.1 |
| 6,971,671 | B2 | 12/2005 | Schneider et al. |

(Continued)

FOREIGN PATENT DOCUMENTS

JP 2005343267 12/2007

OTHER PUBLICATIONS

International Search Report from International Application No. PCT/US08/52201 dated Aug. 1, 2008.

(Continued)

*Primary Examiner*—Ruth Ilan
*Assistant Examiner*—Laura Freedman
(74) *Attorney, Agent, or Firm*—Sally J Brown; Stoel Rives LLP

(57) ABSTRACT

An airbag assembly comprising an airbag cushion, a deployment flap and an extension flap attached to the deployment flap, is disclosed. The deployment flap is configured to protect the airbag cushion as it deploys from the module housing. The extension flap is configured to position the airbag cushion during deployment. In some embodiments, the airbag assembly may also include a cinch tube arrangement.

8 Claims, 5 Drawing Sheets

U.S. PATENT DOCUMENTS

| | | |
|---|---|---|
| 7,083,191 B2 | 8/2006 | Fischer |
| 2002/0020990 A1 | 2/2002 | Sinnhuber et al. |
| 2003/0189319 A1 | 10/2003 | Soderquist |
| 2003/0234520 A1 | 12/2003 | Hawthorn et al. |
| 2007/0057487 A1* | 3/2007 | Kim ........................ 280/728.2 |
| 2007/0120346 A1* | 5/2007 | Kwon ...................... 280/728.2 |
| 2007/0126219 A1 | 6/2007 | Williams |
| 2007/0138779 A1* | 6/2007 | Kwon ...................... 280/743.2 |
| 2007/0170710 A1 | 7/2007 | Bouquier |
| 2007/0278772 A1 | 12/2007 | Burghardt et al. |
| 2008/0023950 A1 | 1/2008 | Kalczynski et al. |
| 2008/0217892 A1 | 9/2008 | Maripudi |
| 2009/0039630 A1 | 2/2009 | Schneider et al. |
| 2009/0152842 A1* | 6/2009 | Benny et al. ............. 280/728.3 |

OTHER PUBLICATIONS

Co-pending U.S. Appl. No. 12/580,488 filed Oct. 16, 2009.
Office Action issued Dec. 9, 2009 in co-pending U.S. Appl. No. 11/956,101.

* cited by examiner

AIRBAG PROTECTION FLAP

TECHNICAL FIELD

The present disclosure relates generally to the field of automotive protective systems. More specifically, the present disclosure relates to airbag deployment systems for preventing damage to the airbag cushion and positioning the airbag cushion during deployment.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the scope of the present disclosure, the embodiments will be described and explained with specificity and detail in reference to the accompanying drawings as provided below.

Figure 1:
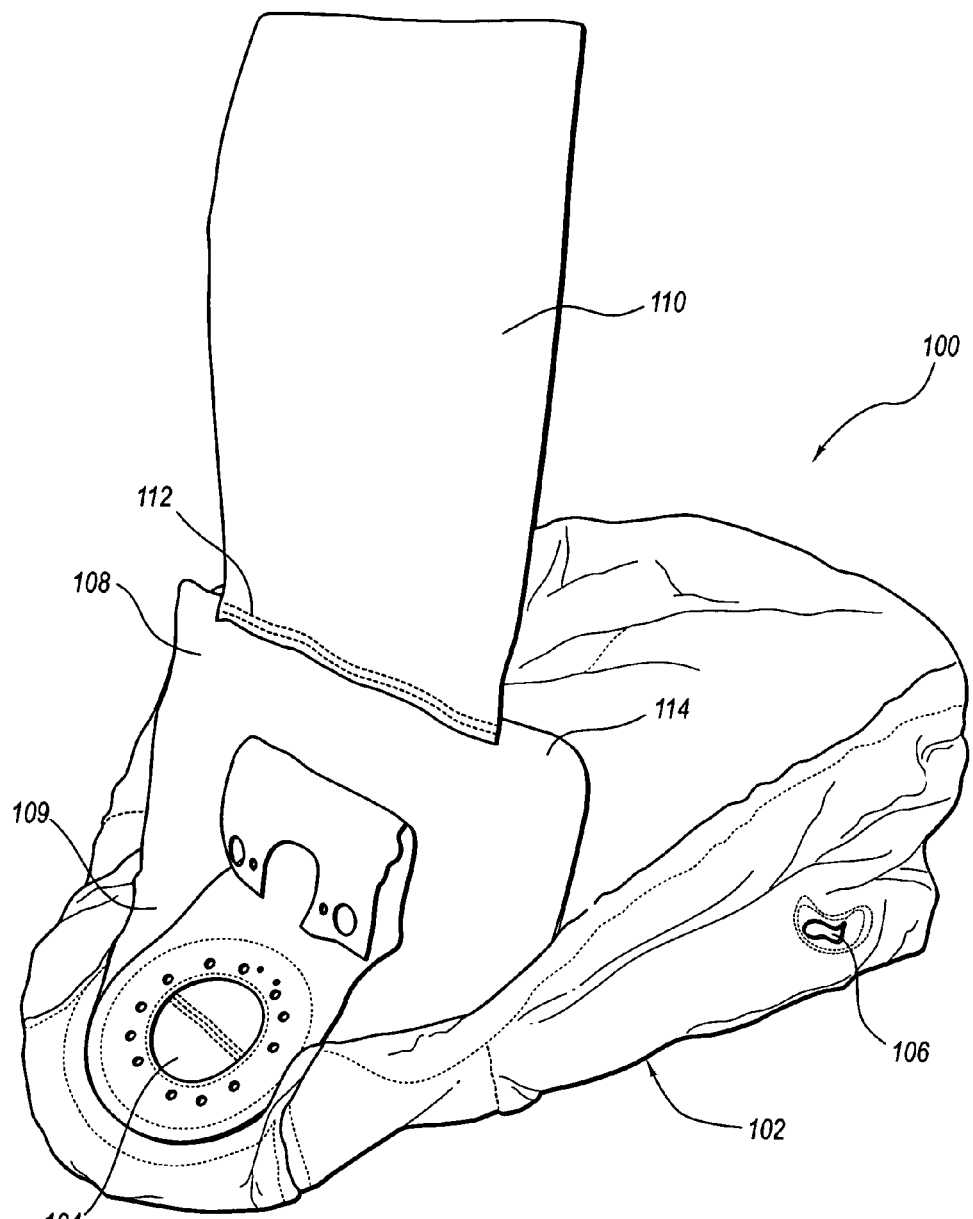
FIG. 1 is a perspective view of one embodiment of an inflatable airbag cushion having a deployment flap coupled thereto and an extension flap coupled to the deployment flap.

| Index of Elements Identified in the Drawings | |
|---|---|
| 10 | instrument panel |
| 12 | vehicle |
| 14 | passenger compartment |
| 16 | car seat |
| 18 | passenger seat |
| 100 | airbag assembly |
| 102 | airbag cushion |
| 104 | gas-introducing throat |
| 106 | vent hole |
| 108 | deployment flap |
| 109 | first end of deployment flap |
| 114 | second end of deployment flap |
| 110 | extension flap |
| 112 | stitching |
| 200 | airbag module |
| 202 | airbag cushion |
| 208 | deployment flap |
| 210 | extension flap |
| 220 | housing |
| 222 | airbag cover |
| 224 | tear seam |
| 226 | inflator |
| 300 | airbag module |
| 302 | airbag cushion |
| 308 | deployment flap |
| 310 | extension flap |
| 320 | housing |

| Index of Elements Identified in the Drawings | |
|---|---|
| 322 | airbag cover |
| 324 | tear seam |
| 326 | inflator |
| 400 | airbag assembly |
| 402 | airbag cushion |
| 408 | deployment flap |
| 410 | extension flap |
| 414 | second end of deployment flap |
| 420 | housing |
| 422 | cover |
| 430 | first end of extension flap |
| 432 | second end of extension flap |
| 434 | distal end of airbag cushion |
| 500 | airbag assembly |
| 502 | airbag cushion |
| 506 | vent hole |
| 510 | extension flap |
| 514 | free end of extension flap |
| 540 | closeable vent |
| 542 | tether |

DETAILED DESCRIPTION

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the present disclosure, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The phrases "attached to" or "attached directly to" refer to interaction between two or more entities which are in direct contact with each other or are separated by a fastener.

Inflatable airbag systems are widely used to minimize occupant injury in a collision scenario. Airbag modules have been installed at various locations within a vehicle, including, but not limited to, the steering wheel, the instrument panel, within the side doors or side of seats, adjacent the roof rail of the vehicle, in an overhead position, or at the knee or leg position.

Airbag cushions that are located in an instrument panel or steering wheel typically deploy directly in front of an occupant. These are commonly referred to as frontal airbag systems. During a collision, the airbag cushion inflates and deploys through a cosmetic cover. The airbag cushion deploys towards the occupant and provides restraint. Conventionally, airbag deployment may be problematic when an occupant is out of position, such as being positioned to closely to the airbag or when an object is considered out of position, such as a rear-facing infant car seat in the passenger seat of a vehicle.

Additionally, as a frontal airbag deploys out of its module housing within the instrument panel, the edges of the cover may be rough. Rough edges in the cover may rub against the airbag cushion as it deploys, possibly causing tearing, holes or snags in the airbag cushion.

Accordingly, airbag assemblies of the present disclosure are provided to protect an airbag cushion from ripping, tearing, or snagging during deployment. Airbag assemblies of the present disclosure also are provided to position the airbag around potential out of position objects such as an infant car seat or out of position occupants so that the airbag cushion does not deploy in an anomalous condition.

FIG. 1 depicts one embodiment of an airbag assembly 100 as shown from a perspective view. Airbag assembly 100 comprises an inflatable airbag cushion 102 constructed of a fabric material. Airbag cushion 102 includes a gas-introducing throat 104 for receiving inflation gas from an inflator (not shown), such as a pyrotechnic inflator. The inflator rapidly produces inflation gas to fill the airbag cushion 102 when activated by a collision sensor system. Airbag cushion 102 also may include vent holes 106 to enable venting of inflation gas to moderate inflation of airbag cushion 102.

Airbag assembly 100 also includes a deployment flap 108 having a first end 109 which is coupled adjacent the airbag cushion 102. In the embodiment depicted in FIG. 1, deployment flap 108 is coupled to airbag cushion 102 adjacent throat 104. In alternative embodiments, the deployment flap 108 may not be attached directly to airbag cushion 102, but may be mounted within the airbag module housing along with the mounting of gas-introducing throat 104. As will be described in greater detail below, deployment flap 108 may function to reinforce the material of airbag cushion 102 and protect airbag cushion 102 from directly impacting the cover of the module housing as the initial inflating sections of airbag cushion 102 force out the cover. The deployment flap 108 may function to protect airbag cushion 102 from ripping, tearing, or otherwise snagging during deployment.

An extension flap 110 is also attached to deployment flap 108 through stitching 112 at a free second end 114 of deployment flap 108. Extension flap 110 may be constructed of fabric or similar material and may alternatively be coupled to deployment flap 108 through adhesives, RF welding and the like. The additional extension flap 110 may increase the likelihood of protecting airbag cushion 102 and help position airbag cushion 102 during deployment due to the location of extension flap 110 relative to airbag cushion 102.

Figure 2:
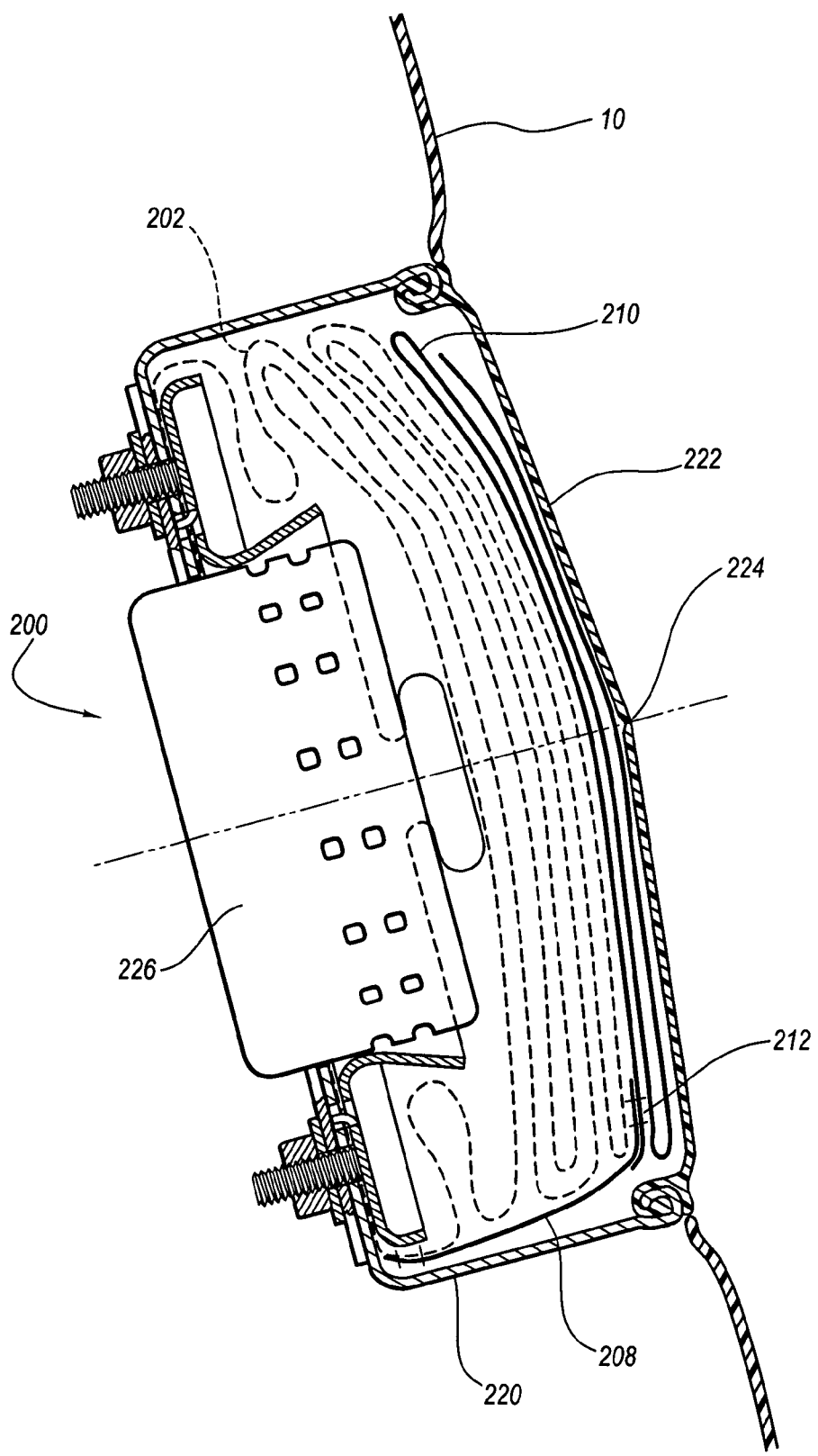
FIG. 2 is a cross sectional side elevation view of an airbag module including one embodiment of an airbag assembly disposed in an instrument panel of a vehicle.

FIG. 2 is an airbag module 200 as shown from a side elevation cross sectional view disposed inside an instrument panel 10. Airbag module 200 includes an inflatable airbag cushion 202 disposed within a housing 220. A deployment flap 208 may be attached to or otherwise coupled adjacent airbag cushion 202, while an extension flap 210 is attached to deployment flap 208 through stitching 212. Extension flap 210 is folded between airbag cushion 202 and an airbag cover 222.

Housing 220 is typically a rigid member that provides a support and mounting structure for airbag module 200 components. Housing 220 may enclose airbag cushion 202, or alternatively may be a mounting plate without side walls. Airbag cover 222 is generally formed from a weaker material than housing 220. Airbag cover 222 provides a surface that is exposed to the inside of the passenger compartment of a vehicle and also a surface that may open to release airbag cushion 202 upon deployment. Housing 220 and cover 222 form an internal volume, such that airbag module 200 may be situated in several locations within a vehicle, including the steering wheel, the passenger side dash and side doors.

Deployment flap 208 and extension flap 210 are folded over airbag cushion 202 in an accordion-like fashion in an undeployed state. Deployment flap 208 and extension flap 210 protect airbag cushion 202 from directly impacting airbag cover 222 during deployment and further reinforce airbag cushion 202 as the initial inflating sections of airbag cushion 202 force out airbag cover 222 through one or more tear seams 224. Tear seams 224 are generally sections of airbag cover 222 that have a reduced thickness compared to other portions of airbag cover 222. Tear seams 224 provide controlled failure locations in airbag cover 222 through which a deploying airbag may pass through.

Deployment of airbag cushion 202 occurs as an inflator 226 generates inflation gas, which is directed into airbag cushion 202. As airbag cushion 202 inflates, it applies a force on both airbag cover 222 and housing 220. Because the relative strength of airbag cover 222 is less than the relative strength of housing 220, the expanding airbag cushion 202 forces through airbag cover 222 into the passenger compartment.

If edges of tear seams 224 are not completely smooth when torn open, the edges may cause tears or rips on the fabric of conventional airbag systems. However, according to the embodiment of FIG. 2, deployment flap 208 and extension flap 210 are configured to reinforce the airbag material as airbag cushion 202 exits airbag cover 222 during deployment. Extension flap 210 is also configured to deploy in front of airbag cushion 202 so that extension flap 210 deploys between airbag cushion 202 and a potential out-of-position object. Because deployment and extension flaps 208, 210 are situated between airbag cushion 202 and airbag cover 202, the interaction with any potentially rough edges will occur with flaps 208, 210 and not airbag cushion 202. This configuration prevents holes, tears or snags from forming in airbag cushion 202.

Figure 3:
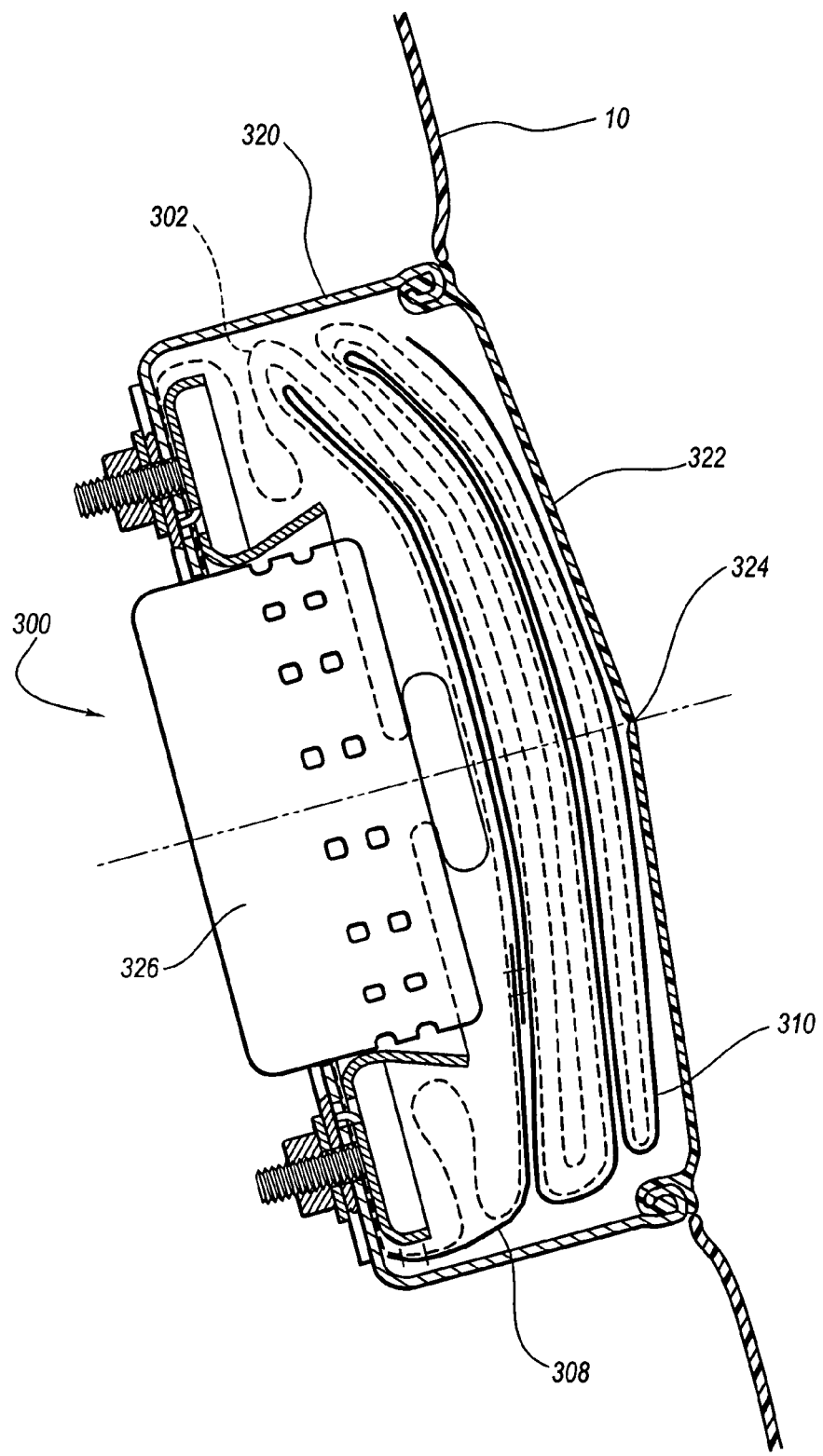
FIG. 3 is a cross sectional side elevation view of an airbag module including another embodiment of an airbag assembly disposed in an instrument panel of a vehicle.

FIG. 3 depicts an alternative embodiment of an airbag module 300 disposed in an instrument panel 10, as shown from a cross sectional side elevation view. Similar to the embodiment of FIG. 2, the present embodiment comprises an airbag module 300, which includes an inflator 326 and an inflatable airbag cushion 302 disposed within a housing 320, behind an airbag cover 322 having a tear seam 324. A deployment flap 308 may be attached to or otherwise coupled adjacent airbag cushion 302, while an extension flap 310 is attached to deployment flap 308. However, unlike the embodiment of FIG. 2, extension flap 310 of the present embodiment is folded with the folds of airbag cushion 302 in an undeployed state.

Deployment flap 308 and extension flap 310 protect and help position airbag cushion 302 during deployment and further reinforce airbag cushion 302 as the initial inflating sections of airbag cushion 302 force out airbag cover 322 through one or more tear seams 324. Airbag module 300 may be situated in several locations within a vehicle, including the steering wheel, the passenger side dash and side doors.

Figure 4:
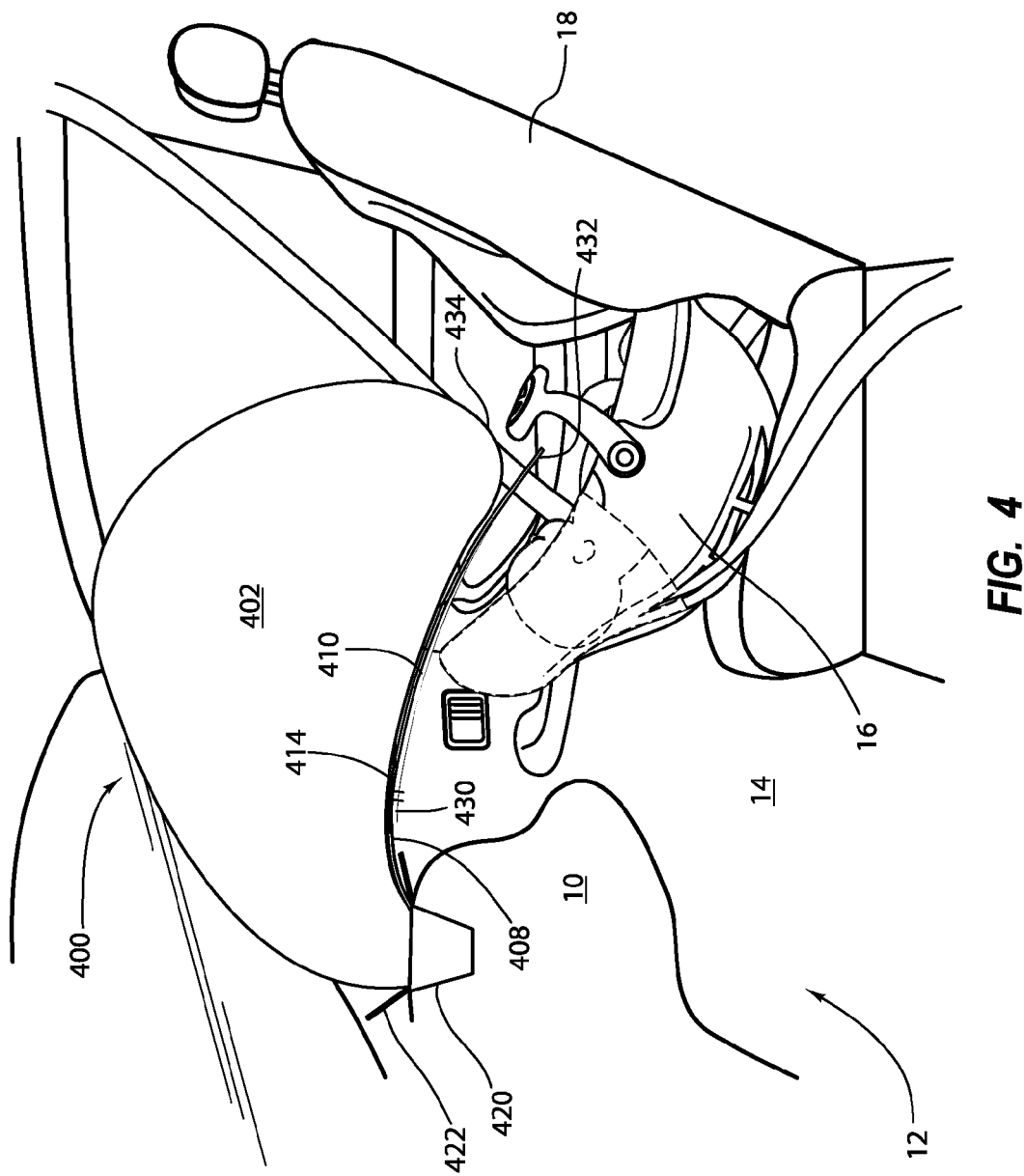
FIG. 4 is a perspective view from inside a vehicle of one embodiment of a passenger-side airbag assembly in a deployed state.

FIG. 4 illustrates one embodiment of a passenger-side airbag assembly 400 in a deployed state, as shown from a perspective view within a passenger compartment 14 of a vehicle 12. An inflatable airbag cushion 402 is shown after it has deployed through an airbag cover 422 from an airbag module housing 420 disposed in an instrument panel 10.

A deployment flap 408 similar to those described herein extends from module housing 420. A first end (not shown) of deployment flap 408 is coupled to or adjacent to the airbag within module housing 420. A second end 414 of deployment flap 408 is attached to a first end 430 of an extension flap 410, through stitching or similar fastening methods. A second or free end 432 of extension flap 410 extends into the passenger compartment 14 and around an out of position object, such as an infant car seat 16 located in the passenger seat 18. In the embodiment shown, second end 432 of extension flap 410 extends beyond a distal end 434 of inflatable airbag cushion 402 when inflated.

In addition to providing protection to airbag cushion 402 as it deploys out of module housing 420, extension flap 410 also functions to position the airbag around out of position objects such as the car seat 16 or an out of position occupant. By guiding the deployment of airbag cushion 402 around problematic objects, extension flap 410 helps airbag cushion 402 to not deploy in an anomalous condition. Airbag cushion 402 is thereby allowed to deploy in a normal state and reduce the potential of injury to occupants by anomalous deployment.

Figure 5C:
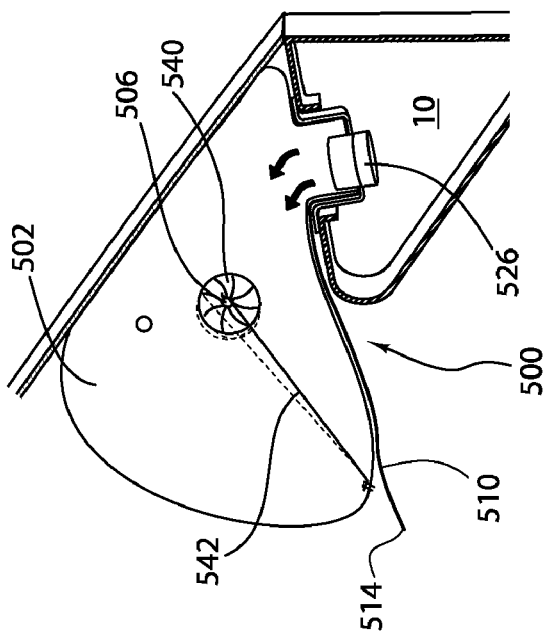
FIG. 5C is a cross sectional side elevation view illustrating the airbag cushion of FIG. 5A in a deployed state.
Figure 5B:
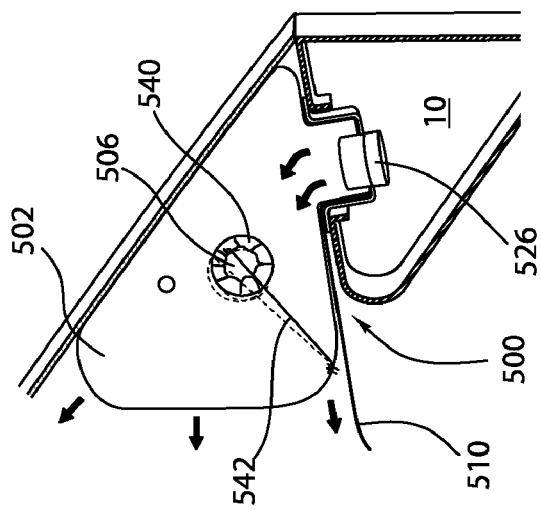
FIG. 5B is a cross sectional side elevation view illustrating the deploying airbag cushion of FIG. 5A at a later stage of deployment.
Figure 5A:
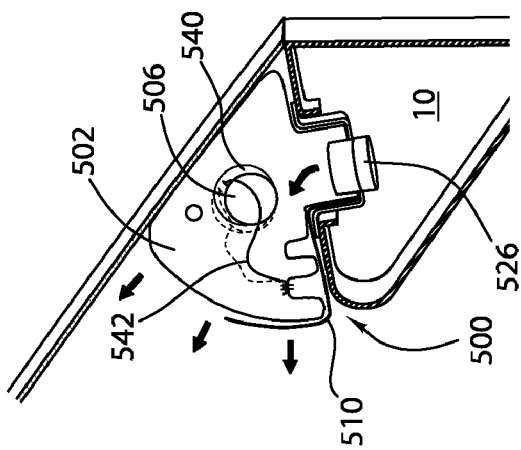
FIG. 5A is a cross sectional side elevation view illustrating initial deployment of an airbag cushion.

FIGS. 5A through 5C represent another embodiment of an airbag assembly 500 deploying from the instrument panel 10, as shown from a cross sectional side elevation view. Airbag assembly 500 includes an airbag cushion 502 which includes a closeable vent 540, such as a cinch tube, and an extension flap 510. Extension flap 510 is integrated with a fabric of the deployment flap, such that a single extended piece of fabric deploys with airbag cushion 502.

Closeable vent 540 may comprise a cinch tube constructed of a nylon woven fabric-type or suitable material known in the art. The closeable vent 540 may be embodied with a generally cylindrical shape and having open ends to enable gas venting. Closeable vent 540 may alternatively be of any suitable shape such as a polygonal shape. Closeable vent 540 may also be embodied with a height that is sufficient to achieve desired closure.

Closeable vent 540 is coupled to the surface of airbag cushion 502 and circumvents a vent hole 506. In one embodiment, closeable vent 540 may extend into the airbag cushion interior, or in other embodiments, closeable vent 540 may extend outside airbag cushion 502. In one embodiment, a single closeable vent 540 may be used, but airbag cushion 502 may include multiple closeable vents, which may optionally be symmetrically disposed in airbag cushion 502 as shown in FIGS. 5A through 5C, to provide additional venting capability.

Airbag assembly 500 includes a tether 542 that couples or engages closeable vent 540 and couples to a surface of airbag cushion 502. Tether 542 may be constructed of a nylon material or other suitable material known in the art. The surface to which tether 542 is connected may be the surface opposing the outer surface that is configured to contact the occupant. The location of where tether 542 is coupled to may depend on module deployment angle, vehicle interior geometry and cushion fold type.

In FIG. 5A, the initially deploying airbag cushion 502 has a slack tether 542 and closeable vent 540 remains open. Extension flap 510 deploys in front of deploying cushion 502. In FIG. 5B, tether 542 is pulled taut and closeable vent 540 begins to close. Extension flap 510 not only helps position airbag cushion 502 around potential out-of-position objects; it also helps ensure proper operation of closeable vent 540. In FIG. 5C, tether 542 is completely taut and closeable vent 540 is closed. Extension flap 510 may extend to adjacent the distal end of airbag cushion 502. Alternatively, and as described above, extension flap 510 may extend beyond the distal end of airbag cushion 502.

If an occupant or another object is in close proximity to deploying airbag 502 and restricts normal inflation, closeable vent 540 remains open and allows gas to rapidly escape from vent hole 506 because tether 542 is slack. However, if the occupant is in a normal position and inflation is unrestricted, the tension of tether 542 pulls on closeable vent 540 to close closeable vent 540. Closure retains inflation gas for normal occupant restraint. Thus, closeable vent 540 and extension flap 510 may be used as a variable feature in out-of-position conditions and in normal restraint conditions. In this manner, airbag cushion 502 is sensitive to obstructive expansion of cushion 502.

Deployment flaps 108, 208, 308, 408 disclosed herein are examples of means for protecting the airbag cushion during deployment from an airbag module housing. Moreover, extension flaps 110, 210, 310, 410, 510 disclosed herein are examples of means for positioning the airbag cushion during deployment. Additionally, closeable vents 540 disclosed herein are examples of means for restricting gas venting.

Without further elaboration, it is believed that one skilled in the art can use the preceding description to utilize the present disclosure to its fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the invention is therefore defined by the following claims.

What is claimed is:

1. A frontal airbag assembly for protecting an out-of-position object, on a passenger-side, comprising:
   an airbag module housing comprising a cover having a tear seam;
   an inflatable airbag cushion configured for frontal deployment on the passenger-side with a bottom surface and an opposing top surface, which is closer to a windshield of a vehicle when the inflatable airbag cushion is deployed than the bottom surface,
      wherein the inflatable airbag cushion is folded with a plurality of folds in the airbag module housing in a stored state, wherein the plurality of folds includes an outermost fold that is the closest fold to the cover;
   a deployment flap,
      wherein the deployment flap has a first end coupled adjacent to the inflatable airbag cushion and a second end that is unattached to the inflatable airbag cushion, and
      wherein the deployment flap has a width, and wherein the width and position of the deployment flap protects the inflatable airbag cushion as the inflatable airbag cushion deploys out of the airbag module housing and through the tear seam; and
   an extension flap,
      wherein the extension flap has an attached end that is fixedly attached to and extends from the second end of the deployment flap and has a free end opposite from the attached end that is unattached,
      wherein, in the stored state, the extension flap is folded and is located between the outermost fold of the inflatable airbag cushion and the cover,
      wherein the extension flap is positioned in front of the inflatable airbag cushion in a passenger compartment of a vehicle during deployment,
      wherein, when the inflatable airbag cushion is fully deployed, the deployment flap and extension flap extend together along the bottom surface of the inflatable airbag cushion to be positioned between the inflatable airbag cushion and an out-of-position object.

2. The airbag assembly of claim 1, wherein the bottom surface of the inflatable airbag cushion terminates at a distal end, wherein the free end of the extension flap extends at least adjacent to the distal end of the inflatable airbag cushion when the inflatable airbag cushion is fully deployed.

3. The airbag assembly of claim 1, wherein the bottom surface of the inflatable airbag cushion terminates at a distal end, wherein the free end of the extension flap extends beyond the distal end of the inflatable airbag cushion when the inflatable airbag cushion is fully deployed.

4. The airbag assembly of claim 1, wherein the extension flap is comprised of fabric.

5. The airbag assembly of claim 4, wherein the extension flap is folded with folds of the undeployed inflatable airbag cushion within an airbag module in a stored state.

6. The airbag assembly of claim 1, wherein the extension flap is attached to the deployment flap through stitching.

7. The airbag assembly of claim 1, further comprising:
 a closeable vent disposed on the inflatable airbag cushion; and
 a tether coupled to the closeable vent and coupled to a surface of the airbag.

8. The airbag assembly of claim 7, wherein the tether is configured such that upon deployment of the inflatable airbag cushion with obstruction, the tether does not fully extend and the closeable vent remains open, and upon deployment of the inflatable airbag cushion without obstruction, the tether extends and at least partially closes the closeable vent.

* * * * *